Nov. 25, 1941.                H. O. WILSON                    2,263,911
                              WATER VEHICLE
                          Filed March 27, 1939              2 Sheets-Sheet 1

INVENTOR.
Harry O. Wilson
BY
Horry Hamilton
ATTORNEYS

Nov. 25, 1941.  H. O. WILSON  2,263,911
WATER VEHICLE
Filed March 27, 1939  2 Sheets-Sheet 2

INVENTOR.
Harry O. Wilson
BY Henry Hamilton
ATTORNEYS

Patented Nov. 25, 1941

2,263,911

UNITED STATES PATENT OFFICE

2,263,911

WATER VEHICLE

Harry O. Wilson, Carson City, Nev.

Application March 27, 1939, Serial No. 264,319

2 Claims. (Cl. 115—22)

This invention relates to vehicles in the nature of those adapted to be propelled by the rider over the surface of water, and the primary object is to provide such a device wherein is incorporated simple, rugged, durable and inexpensive means for safely and comfortably supporting the rider while propelling force is being imparted to the driving means of the vehicle.

One of the important aims of this invention is to provide a water vehicle of the aforementioned type having a pair of side by side, spaced apart pontoons upon which is mounted unique framework, a portion of which extends vertically upwardly between and above the pontoons and whereon suitable seats and handle bars are mounted.

A further aim of this invention is to provide a water vehicle of the nature permitting the rider to impart propelling force thereto through the medium of a number of operably interconnected treadles, which treadles serve to drive a uniquely disposed propeller positioned between and below the pontoons.

Another aim of this invention is to provide a water vehicle having buoyant pontoons whereupon is mounted a specially formed frame having seats and handle bars for the occupants of the vehicle, certain of said handle bars being operably connected to a rudder serving as a guide for the vehicle as the same is driven forward over the surface of water.

An even further object of this invention is to provide a water vehicle of the aforementioned character and which is equipped with a pair of pontoons with a frame having portions thereof comprising clamps which encircle the pontoons and which may be manipulated to quickly replace a pontoon whenever the occasion arises.

Another object of the invention is to provide a water vehicle with pontoons of a special form which form includes the contour of the end walls of the cylindrical pontoons.

Minor objects of the invention will appear during the course of the following specification, referring to the accompanying drawings wherein.

Figure 1:
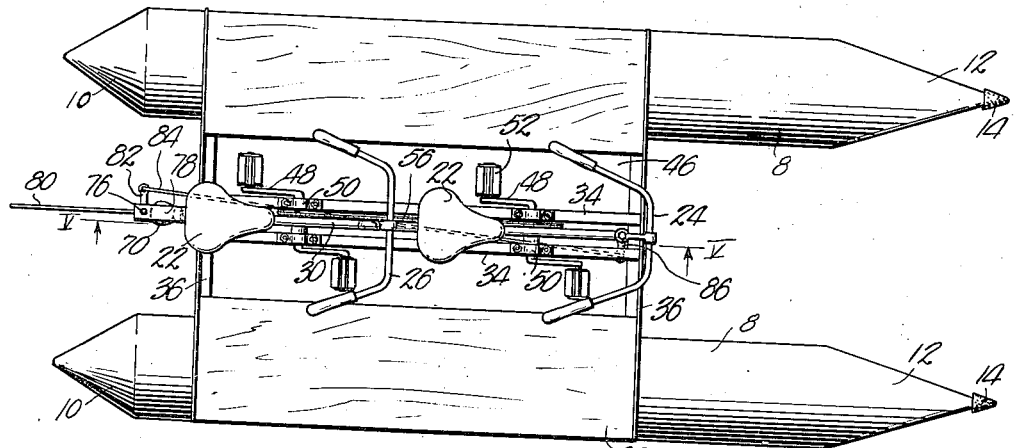
Figure 1 is a top plan view of a water vehicle made in accordance with this invention.

The illustrated embodiment of the vehicle is best adapted for the pleasure of the occupants and the same has been successfully used on bodies of water where the waves on the surface of the water do not exceed a height which will affect the normal desired position of a pair of side by side, spaced apart pontoons 8, each of which is an elongated, cylindrical, hollow body provided with end walls 10 and 12. Wall 10 is conical and the apex thereof is on the longitudinal axis of pontoon 8. This wall 10 closes the trailing end of each pontoon and because of its contour, overcomes the tendency which a flat transverse wall would have to retard the forward movement of the vehicle.

Wall 12 closes the forward end of each pontoon 8 and the side and lower faces are tapered outwardly and inwardly to terminate in a point which lies on the projected plane of the uppermost surface of pontoon 8. This pointed wall 12 is provided with a rubber bumper 14 which may be of sponge rubber or other suitable substance capable of overcoming impacts.

A frame 16 is mounted on the two pontoons 8 and comprises a vertical portion 18 that extends upwardly on a plane parallel to the major axes of pontoons 8 and intermediate the said pontoons. This upwardly extending portion 18 of frame 16 should be made of tubular metal, welded together to form a plurality of standards 20, two of which carry seats 22 for the vehicle riders. The other standard 20 is disposed at the forward end of portion 18 and carries handle bars 24 to be used by the person occupying the foremost seat 22.

Handle bars 26 carried by stem 28 are merely to supply a suitable grip for the occupant of the rearmost seat 22 and a longitudinally extending tie-rod 30 joins standards 20.

Outwardly and downwardly inclined members 32 form integral parts of standards 20 and create legs, the lower ends of which rest upon a pair of spaced apart bars 34 which are disposed longitudinally of frame 16 on a medial line between pontoons 8. The ends of bars 34 rest upon bridging elements 36, each of which extends transversely across pontoons 8 and in spaced relation thereabove. Bridging elements 36 may be made of angle iron and secured to pontoons 8 by specially formed brackets 38, each of which has members cooperating to circumscribe the pontoons.

Figure 3:
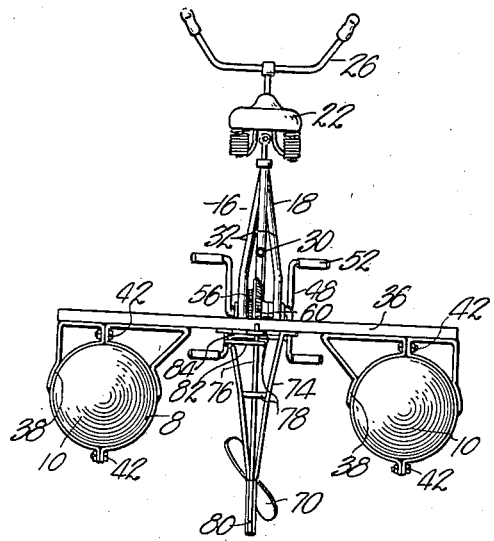
Fig. 3 is a rear end elevational view of the water vehicle.
Figure 4:
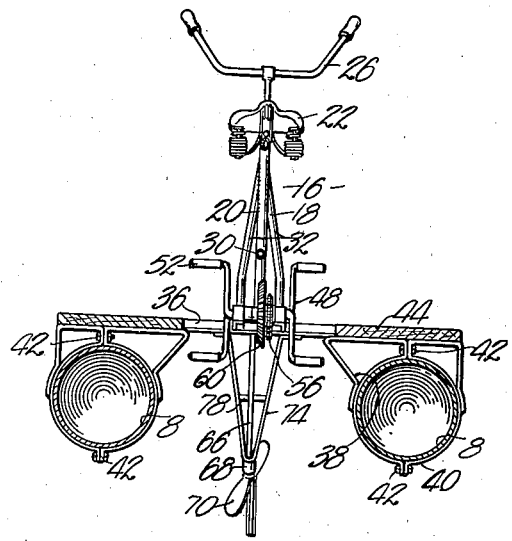
Fig. 4 is a vertical cross sectional view through the same, taken on line IV—IV of Fig. 2.
Figure 5:
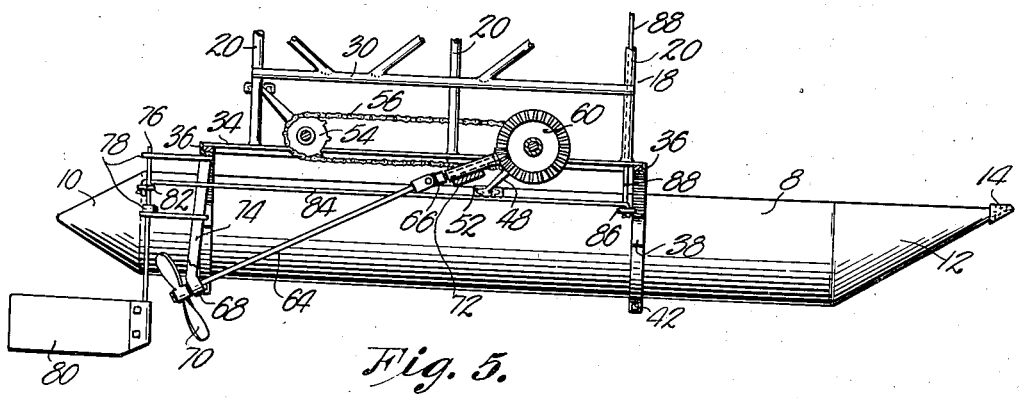
Fig. 5 is a fragmentary vertical longitudinal sectional view through the lower portion of the vehicle taken on line V—V of Fig. 1; and, Fig. 6 is an enlarged fragmentary detailed sectional view through a portion of the vehicle taken on line VI—VI of Fig. 2.
Figure 6:
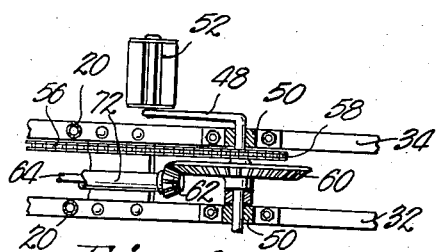

A clamp 40 is removably secured to the remaining portion of each bracket 38 by bolts 42 of similar means and when the clamp is of the form shown in Figs. 3 and 4, it is obvious that the same may be removed from operative position so that the associated pontoon 8 might be replaced by a new one. Bracket 38 holds pontoons 8 and bridging elements 36 in spaced relation so that splashing water might pass entirely over the top of the pontoons and not be confined within pockets or other retaining cavities that may be found, if pontoons 8 were secured directly against the members which they support.

Figure 2:
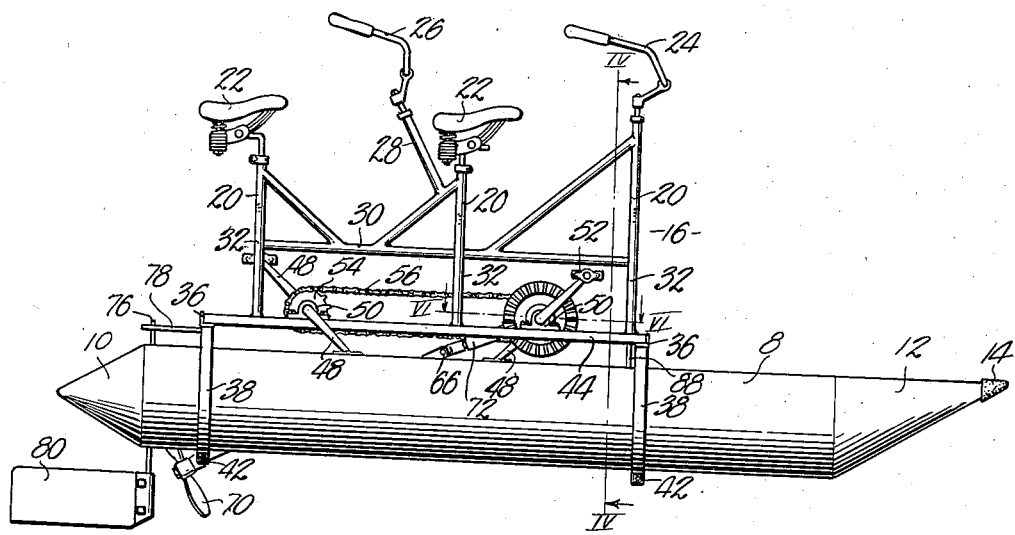
Fig. 2 is a side elevation of the same.

A platform 44 carried by frame 16 above each pontoon 8 respectively, provides convenient flooring for the riders when mounting or dismounting of the vehicle occurs. These platforms have the inner proximal edges thereof spaced apart a sufficient distance to provide an opening 46 through which passes the two treadles 48 journalled in bearings 50, which in turn are mounted upon bars 34. Each treadle 48 has a foot engaging pedal 52 and when the vehicle is made to support two riders, the arms of treadles 48 should be positioned in the relation shown in Fig. 2, which insures an even application of force by the rider.

The rear treadle 48 carries a sprocket wheel 54 over which passes chain 56. The forward treadle 48 carries a similar sprocket 58 as well as a bevel gear 60 which is in mesh with pinion 62. Through such arrangement the force imparted to both treadles is transmitted to gear 60 and thence to shaft 64, which is driven by pinion 62. A universal joint 66 is interposed in shaft 64 so that the latter may be downwardly and rearwardly inclined toward bearing 68, near which propeller 70 is placed. The forward end of shaft 64 is journalled in a bearing 72 rigidly secured between bars 34 and 32.

Bearing 68 for shaft 64 is at the lower end of a fixture 74, which depends from bridging element 36 at the rear of the vehicle.

A vertical shaft 76 is rotatably journalled in bearings 78 integral with frame 16 and projects downwardly a distance which insures that rudder 80 will always be below the surface of the water. A radial arm 82 on shaft 76 has the front end thereof in engagement with one end of connecting rod 84, the other end of which is pivotally attached to radial arm 86 carried by vertical rod 88 to the upper end of which is operably attached the forward handle bars 24. Thus, when handle bars 24 are moved about the axis of rod 88, rudder 80 will be manipulated to guide the vehicle.

The operation of an amusement device of the character illustrated and described, is obvious to one skilled in the art, and while the form hereby disclosed might be modified, it is desired to be limited only by the spirit of the invention and scope of the appended claims.

Having thus described the invention, what is claimed as new and desired to be secured by Letters Patent is:

1. A vehicle of the character described comprising a pair of spaced apart, side by side pontoons; a frame mounted on the pontoons having a vertical portion between and above the pontoons; a seat fastened to the frame; handle bars carried by the frame; a propeller disposed between the pontoons adjacent to one end thereof; treadles operably joined to the propeller and engageable by the rider when occupying the seat; a rudder movably mounted on the frame; and means operably joining said handle bars and the rudder, said frame having a platform thereon along each side respectively of the vertical portion thereof, said platforms being held spaced above the pontoons by said frame, said platforms being extended outwardly with their outer edges in a plane with the outermost longitudinal edges of the pontoon above which they are held.

2. A vehicle of the character described comprising a pair of spaced apart, side by side pontoons; a platform disposed above each pontoon respectively; a frame mounted on the pontoons having a vertical portion between and above the pontoons; a seat fastened to the frame; handle bars carried by the frame; a propeller disposed between the pontoons adjacent to one end thereof; treadles operably joined to the propeller and engageable by the rider when occupying the seat; a rudder movably mounted on the frame; and means operably joining said handle bars and the rudder, said frame having portions thereof circumscribing the pontoons, said circumscribing portions each including a clamp for releasably securing the pontoons in place, each clamp comprising two operable parts circumscribing the pontoons when joined together, each of said parts having an integral extension presenting a normally horizontal face for supporting the platform above the top of the pontoon.

HARRY O. WILSON.